Patented Nov. 25, 1952

2,619,416

UNITED STATES PATENT OFFICE 2,619,416

HERBICIDE

Lawrence J. King, Yonkers, N. Y., assignor, by mesne assignments, to Union Carbide and Carbon Corporation, a corporation of New York No Drawing. Application November 2, 1949, Serial No. 125,174

5 Claims. (Cl. 71—2.5)

This invention relates to herbicides which are germinative toxicants and so selective in their action that they may be used, for instance, on a field planted to cotton, beets, turnips, cabbage and the like dicotyledonous plants to inhibit pest grasses and not harm the crop plant or its seeds. The materials disclosed herein have been found to possess little or no phytotoxicity operable through the leaves even though the leaves of the broad leaf plants are completely wet with aqueous sprays containing the chemicals at such concentrations that, applied to the surface of the earth, they profoundly affect the growth of grass seeds; also, the chemicals may be applied to fitted land after planting, for instance beets, and inhibit the growth of annual grass while not inhibiting the growth of the beets; and they may be applied to growing beets, cotton and the like, to inhibit the growth of these grasses yet not inhibit the beets either by root intake or leaf absorption.

In recent years the demands of agriculturists have been for chemicals which will save much manual labor in preventing the growth of grass in crops. Materials of general phytotoxicity are known and to some extent selective activity has been recognized, for instance sodium chloride applied to beets helps the beets and keeps down the grass and other weeds. Within the past several years the selective effects of the material known as 2,4-D have been recognized; however, 2,4-D has epinastic properties, exerts a selective action through the foilage of the plant and is dangerous to use where there is an opportunity for the material to be wind-borne from one plot of ground to another.

The materials disclosed herein as operative have substantially no contact-burning or toxic effect when applied to the tops of plants, but operate primarily through root uptake to inhibit germination and growth of seedling grasses, or the growth of older grasses.

All of the operable materials disclosed herein have the formula:

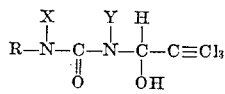

where

X and Y are H or $CH_3$

X and Y together are $CH_2$—$CH_2$

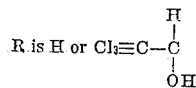

These materials are all saturated aliphatics and, as will be seen from the following Table 1, materials with slightly varying formulae give unsatisfactory results. The satisfactory materials are all of the type which would be classed as water insoluble.

In making the tests reported in the three left hand columns of Table 1, growing bean, corn and tomato plants about 21 days old were used. The bean plants were about 12 inches high with several pairs of fully expanded trifoliate leaves, the corn plants about 12 inches high with 5 to 7 leaves, and the tomato plants about 8 to 10 inches high with 4 to 6 leaves. These plants were sprayed, until the leaves were wet, with aqueous sprays containing 99 parts by weight of water and 1 part of the respective materials listed in the table. The treated plants were then placed in a greenhouse. The phytotoxicity ratings given in the three left hand columns of Table 1 represent the condition of the treated plants on the seventh day after spraying. The spraying methods are explained in more detail in an article entitled "A Greenhouse Method of Evaluating Fungicides by Means of Tomato Foliage Diseases," by S. E. A. McCallan and R. H. Wellman, Contributions Boyce Thompson Institute, 13: 93–135, 1943. The object of the test was primarily to determine the epinastic or foilage-contact effects of the materials.

The tests giving the results reported in the four right hand columns of Table 1 were made to determine the inhibitive effect of the materials listed in the table against grasses, represented by rye grass (*Lolium multiflorum*) and broad leaf plants represented by turnip (var. White Globe). Rye grass was chosen because it is usually more resistant to chemicals than is, for instance, crabgrass or similar grasses. In making the test, 25 seeds of each type of plant were planted in each of a series of 4 inch pots, each pot containing only one type of seed. The earth in all of the pots was then saturated with water and allowed to drain for 4 hours to settle the earth and allow the seeds to become fully imbibed. Two test compositions were prepared from each material listed in the table, one composition consisting of 0.1 part of the material plus sufficient water to make 100 parts, and the other composition consisting of 0.01 part of the material plus water to make 100 parts, all parts by weight. At the end of the 4 hour imbibition period, 40 ml. of a test composition were sprinkled on the earth in a pot, until each pot received one 40 ml. dose and each type of seed received a dose of each material at both concentrations. The application of 40 ml. of the compositions at concentrations of 0.1 part and of 0.01 part per 100 parts represents roughly the application of the materials at the rates of 50 pounds and of 5 pounds per acre. After the application of the compositions, the pots receiving the treatment were transferred to a greenhouse together with control pots of a like number of turnip and grass seeds which received no treatment. On the seventh day after the seeds were planted and treated, the condition of the plant growth from the seeds was noted. The ratings are given in the four right hand columns of Table 1. The control plants were used to determine the normal growth of the seeds into plants. The object of the test was to determine the critical distinctions between operable and inoperable materials.

worse condition than plants given a "B" rating or a "B+" rating but they are in better condition than plants given a "C" rating.

From the results given in Table 1, it will be seen that materials 1, 2, and 3 are satisfactory because of contact non-phytotoxicity to representative crop plants, non-inhibitive effect to turnip (a representative dicotyledonous, non-leguminous crop plant), and a high inhibitive effect to rye grass, a monocotyledonous plant. The other materials fail in at least one of the features required in a satisfactory material and hence are not susceptible of use.

Using dichloral urea as a representative material, it was desired to determine its selectivity and effectiveness against crabgrass and in comparison with another chemical having inhibitive effects. In the tests for Table 2, farm land in-

TABLE 1

| No. of compound | Name of compound | Phytotoxicity rating 1 percent | | | Pot test | | | |
|---|---|---|---|---|---|---|---|---|
| | | | | | Turnip | | Rye grass | |
| | | Bean | Corn | Tomato | 0.1 | 0.01 | 0.1 | 0.01 |
| 1 | Dichloral urea | A− | A | A | A− | A | D+ | C+ |
| 2 | alpha-hydroxy-beta (trichloroethyl) carbamide | A− | A | A | A− | A | C+ | C+ |
| 3 | N,N'-Bis (alpha-hydroxy-beta-trichloroethyl)-1,3-ethylene urea | A− | A | A | A− | B | D | D |
| 4 | N-Hydroxyethyl N,N' bis (alpha-hydroxy-beta trichloroethyl) carbamide | A− | A− | A− | A | A | C+ | B |
| 5 | alpha-Hydroxy-beta-tri-chloroethyl-allyl-urethane | C | B | D | C | B | D− | B− |
| 6 | N-(alpha-Hydroxy-beta-trichloro-ethyl) acetamide | A | A | A | A | A | E+ | A |
| 7 | N-(alpha-Hydroxy-beta-trichloro-ethyl) acrylamide | A | A | A | C | B− | C+ | B |
| 8 | N-(alpha-Hydroxy-beta-trichloro-ethyl) methyl-furmaramate | A | A | A | A | A | B | A− |
| 9 | N-(alpha-Hydroxy-beta-trichloro-ethyl)-1,2,2-trichloro-acrylamide | C | A− | D | E | A | E+ | A |
| 10 | N-(alpha-Hydroxy-beta-trichloro-ethyl) crotonamide | A | A | A | A | A | A− | A− |
| 11 | N-(alpha-Hydroxy-beta-trichloro-ethyl) chloro-acetamide | C | C | D | A | A | D | B− |
| 12 | sym.-Di(alpha-acetoxy-beta-trichloro-ethyl) carbamide | A | A | A | C | B+ | C+ | B+ |
| 13 | Anhydrodichloral urea | A | A | A | B | A | A− | A− |
| 14 | N-(alpha-Hydroxy-beta-trichloro-ethyl) maleamic acid | A | A | A | A | A− | C+ | A− |
| 15 | sym.-Di(alpha-butyroxy-beta-trichloroethyl) carbamide | A | A | A | B+ | A | A− | A− |

INTERPRETATION OF RATINGS

| Contact phytotoxicity | Inhibition |
|---|---|
| A, no injury | No inhibition (80–100% of seeds germinated and grew, usually being nearer 100% than 80%). |
| B, slight injury | Slight general inhibition (70–80% of seeds germinated and grew). |
| C, moderate injury | Moderate general inhibition (60–70% of seeds germinated and grew). |
| D, severe injury | Severe general inhibition (40–60% of seeds germinated and grew). |
| E, plants dead | Practically complete general kill of seeds or seedlings (0–40% of seeds germinated and grew, usually being nearer 0% than 40%). |
| A−, injury so very slight that it would escape usual notice. | |

It usually happens that where a material inhibits the germination of seeds, it has a bad effect on the development of such plants as do sprout, the growth being inhibited or the plants dwarfed or the leaves curled, etc. Thus, materials given the pot test and classed as C not only let less seeds germinate than materials classed as B, but where the rating is C the plants are usually in worse physical condition than are plants given a B rating. But some materials have particularly noticeable effects on the physical condition of the plants; and the "+" value accompanying some letters in the pot test ratings of Table 1 indicates that the plants are in poorer condition than plants which have no "+" or "−" rating and the "−" value indicates that the plants are in poorer condition than plants which have a "+" rating. Thus, in the pot test ratings where a "B−" rating is given, the plants are in fested with crabgrass and other miscellaneous weeds was fitted and marked off in plots 50 sq. ft. in area. Randomly selected plots were treated and other check plots were not treated. The treatment consisted of spraying the plots with aqueous sprays of dichloral urea and of isopropyl phenyl carbamate of such concentrations that respective plots received the inhibitors at the rates of 1 pound and 5 pounds per acre in water at 100 gallons per acre, each treated plot receiving one treatment 3 days after fitting. Fourteen days after the treatments, counts of the number of crabgrass plants and of broad leaf plants in 6 randomly selected 6 inch by 6 inch squares of each plot were made. In Table 2, the figures represent the percentage of plants in the treated plots based on the number of corresponding plants in the untreated check plots as 100 per cent, considering the 6 randomly selected squares as representative of the plots.

TABLE 2

| | Rates, lbs./acres | Crabgrass number as percent of check | Broad-leaves number as percent of check |
|---|---|---|---|
| Dichloral urea | 1 | 39 | 91 |
| | 5 | 6 | 89 |
| Isopropyl phenyl carbamate | 1 | 100 | 100 |
| | 5 | 84 | 81 |

It was also desired to test the operability of dichloral urea as representative of the materials contemplated herein, for preventing the growth of crabgrass in well-established turf, for instance in established lawns. For this test a lawn in the vicinity of New York, N. Y., highly infested with crabgrass seeds, was marked off into test plots 20 x 50 feet, separated by check plots 10 x 50 feet. The latter part of April aqueous sprays containing dichloral urea were applied to certain randomly selected test plots at the acre rates of 3 pounds and 5 pounds of dichloral urea in 40 gallons of water. About the middle of May the respective plots were given another aqueous spray treatment at the same rates of dichloral urea but the water was applied at the rate of 80 gallons per acre. The check plots received no treatment and no water corresponding to the water given the test plots. During the early part of October, data were taken by laying a tape diagonally across a plot and then measuring the lengths of tape which laid over crabgrass plants. On the test and check plots, the diagonals were approximately 54 and 51 feet in length, respectively. In Table 3, column A gives the number of feet of tape overlying crabgrass and column B gives the per cent control of crabgrass relative to the check calculated according to the formula $$B = 100 - \left(\frac{\text{Column A figure for treated plot}}{\text{Column A figure for untreated plot}}\right) \times 100$$

for example $$B = 100 - \left(\frac{.6}{11.3}\right)100 = 100 - 5.3 = 94.7 \text{ or } 95$$

The calculated per cent control would be slightly higher if allowance were made for the different lengths of the diagonals of the treated and check plots.

TABLE 3

| Plot | Rates, lbs./acre | A | B |
|---|---|---|---|
| Treated | 5 | 0.6 | 95 |
| Adjacent check | 0 | 11.3 | 0 |
| Treated | 3 | 12.2 | 58 |
| Adjacent check | 0 | 29 | 0 |

In the above test the established turf grass was uninjured except that its growth was slowed slightly as compared with the growth of the turf grass in the untreated check plots. This is not undesirable for the householder as the lawn grass does not have to be cut so often. The herbicides have been found to kill crabgrass seeds as well as seedlings about ½ inch high or less, and may be applied successfully at any time prior to the time that the seedlings reach this height. The seeds and seedlings of bent grasses and bluegrass are more resistant than crabgrass seeds and seedlings, and the established plants of the bent and bluegrasses are especially resistant. Applied at the rate of 5 pounds per acre, the herbicides remain in the soil at such concentrations as are effective to inhibit the germination of crabgrass seeds for at least from 2 to 3 weeks during the spring when the rains are relatively heavy and much longer during the summer when the rains are from moderate to light. To rid a lawn of crabgrass, areas infested with crabgrass should be seeded in the fall with desirable grass seed. For lawns in the vicinity of New York, N. Y., the herbicides should be applied at about 5 pounds per acre about the latter part of April, before crabgrass sprouts, and again at about 3 pounds per acre if and when crabgrass sprouts, which will depend upon the amount of rain or sprinkling to which the lawn is subjected. If lawn grass is to be planted, about 3 weeks after the last application of herbicides, the lawn should be thoroughly watered and thereafter desirable grass may be seeded in any places not sufficiently seeded the preceding fall.

The tests for Table 4 were made to determine the effect of dichloral urea as representative of the materials disclosed herein as operable, on cabbage. In making the crop tolerance tests, land was fitted, marked into plots 200 square feet in area and given weights of cabbage seeds were planted in each plot. Randomly-selected plots were treated and other check plots were untreated. The treatment consisted of spraying the plots, three days after the land was fitted and the cabbage seeds were planted, with aqueous sprays of dichloral urea of such concentrations that respective plots received the herbicide at the rates of 1¼ pounds, 2½ pounds, 5 pounds, and 10 pounds in 100 gallons of water, per acre. Fifty-two days after the sprays were applied, each plot received a second dose of the same amount of the same inhibitive material as first applied, but in the second dose the material was applied as a dust composed of 5% by weight of dichloral urea and 95% by weight of pyrophyllite. When the heads of cabbage in the check plot reached about one and one-half pounds in weight, the crop was harvested and the data, reading across the table, are the rate per acre at which the dichloral urea was applied at each dose, the number of heads of cabbage harvested from each plot, and the average weight of each head of cabbage.

TABLE 4

| Rates, lbs./acre | Cabbage | |
|---|---|---|
| | No. heads | Average weight per head in lbs. |
| 1¼ | 26 | 1.42 |
| 2½ | 34 | 1.58 |
| 5 | 27 | 1.48 |
| 10 | 11 | .90 |
| Check | 27 | 1.59 |

The tests for Table 5 were made to determine the effect of dichloral urea in different amounts (crop tolerance) on rye grain, beets, and turnips. The tests were made in the same general manner as described for Table 2, farm land being fitted and marked off in 5 x 10 foot plots separated by check strips 2½ x 10 feet. A series of 5 test plots and 5 check strips, all randomly selected, were each planted to rye, to beets, and to turnips. The same weights of rye seeds were planted in each test plot assigned to rye and a proportionate amount in the check strips assigned to rye. In a similar manner beet seeds and turnip seeds were planted in test plots and check strips. On the third day after planting the seeds, randomly selected test plots planted to rye, beets and turnips received aqueous sprays of dichloral urea at the rate of 100 gallons of water and 2½ pounds of dichloral urea per acre, other test plots of each seed received aqueous sprays at the rate of 100 gallons of water and 5 pounds of dichloral urea per acre, and other plots received other sprays at the acre rate of 100 gallons of water and 10 and 33 pounds of dichloral urea. The check plots received no spray and no dichloral urea. On the sixty-sixth day after spraying, the average heights of the plants in the various test plots and check strips were computed from height measurements of the plants and are given in Table 5, the average height of rye plants in the check strips being taken as 100% for rye and the average height of the rye plants in the test plots planted to rye and receiving the several dichloral urea treatments being given as a percentage of the average height of the rye plants in the check strips. Similar measurements and calculations were made for beet and turnip plants.

TABLE 5

| Rate in lbs./acre | Height as percent of check | | |
|---|---|---|---|
| | Rye | Beets | Turnips |
| 2½ | 42 | 100 | 100 |
| 5 | 18 | 97 | 100 |
| 10 | 3 | 55 | 81 |
| 33 | 0 | 50 | 80 |

Tests have also been made using aqueous sprays of dichloral urea on field-grown cotton and on sugar beets, the sprays being applied at the rate of 100 gallons per acre and the dichloral urea in the sprays at the rate of 5 pounds per acre for cotton and 4 pounds per acre for beets. Sprays of these concentrations were applied 3 days after the plantings. In the cotton the pest vegetation was principally crabgrass, and in the beets the pest vegetation was principally foxtail or pigeon grass. Visual estimates made about 30 day after the sprayings were that there was no injury to the cotton, and no appreciable injury to the beets on the treated fields as compared with untreated check fields and substantially none of the pest grasses grew on the treated fields while they were rampant on the untreated fields.

In another test a field was fitted, planted to beets and laid off in 20 x 20 foot plots. Randomly selected plots were given one treatment with dichloral urea sprays, 3 days after planting, at the acre rates of 6 pounds and 10 pounds of dichloral urea suspended in 40 gallons of water. Other check plots, adjacent to the treated plots, were untreated. Grass counts were taken a month after treatment, the entire set of plots was cultivated within 2 days after the counts were taken and, again, a month after the first cultivation. Beet yields were taken 14 weeks after planting. The grass was mostly Panicum sp., which is somewhat more resistant to treatment than pigeon grass and crabgrass. Many of the grass plants were stunted and dwarfed and had injured roots and would not have survived to the seeding stage, but were included in the counts because they were still living at the time the counts were taken. The grass counts were made by counting the grass plants in 12 randomly selected 6 x 6 inch squares in each of two plots receiving the same treatment. The per cent control is calculated according to the formula % control = 100 −

$$\left(\frac{\text{number of plants counted in treated areas} \times 100}{\text{number of plants counted in untreated check areas}}\right)$$

The beet yield is the average pounds of beets per plot, each plot having been planted to have eight 20 foot rows. Table 6 gives the results of the test.

| Rate, lbs./acre | Beets, lbs. | Grass control, percent control of the check |
|---|---|---|
| 10 | 45 | 68 |
| 6 | 39 | 66 |
| 0 (check) | 41 | 0 |

In the following examples, methods of making the operable materials are given.

Dichloral urea

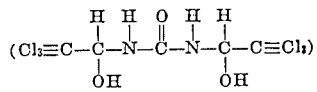

was prepared by stirring 2 moles of chloral hydrate into 1 mole of urea dissolved in 10 moles of water containing 0.16 mole of HCl as a catalyst. The reaction occurred at 30° C., the dichloral urea coming down as a white crystalline precipitate during 144 hours. The product was filtered off and washed with water. The dried product was a white crystalline material with a melting point of 200° C. The material is soluble in water only to the extent that a saturated aqueous solution contains less than 0.01 gram of the material in 100 grams of water at 20° C.

*Example 2*

Alpha-hydroxy-beta-trichloroethyl carbamide

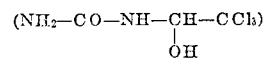

was prepared by stirring 1 gram mole of chloral hydrate into 250 cc. of water containing 2 gram moles of urea. The mixture was maintained at 25° C. for 48 hours, the product coming down as a white crystalline precipitate. After washing with water, recrystallizing from a mixture of 2 gram moles of ethanol and 3.2 gram moles of benzene, filtering and volatilizing the adhering ethanol-benzene solvent, the product melted at 150° C. with decomposition. A saturated aqueous solution of the material contains less than 0.1 gram of the material in 100 grams of water at 20° C.

*Example 3*

N,N'- bis(alpha-hydroxy-beta-trichloroethyl)-1,3-ethylene urea

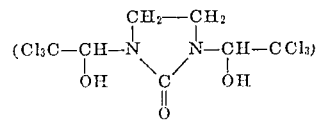

was prepared by stirring 2 moles of choral into 1 mole of ethylene urea maintained at 30°–40° C. for 30 minutes. Upon cooling the reaction mass to 10° C. and holding at this temperature for 30 minutes, the reaction mass set to a white, crystalline solid which, after washing thoroughly with water and drying, melted at 55°–57° C. A saturated aqueous solution of the material contains less than 0.01 gram of the material in 100 grams of water at 20° C.

To facilitate an understanding of the invention, the formulae of the additional materials referred to in Table 1 are given in the following:

N - hydroxyethyl - N,N' - bis(alpha - hydroxy-beta-trichloroethyl) carbamide

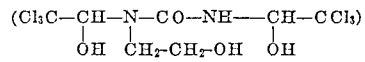

alpha-hydroxy-beta-trichloroethylallyl urethane

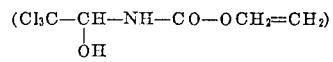

N-(alpha-hydroxy-beta-trichloroethyl) acetamide

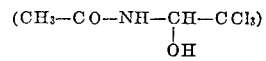

N-(alpha-hydroxy-beta-trichloroethyl) acrylamide

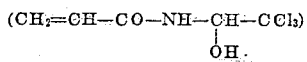

N-(alpha-hydroxy-beta-trichloroethyl) methylfumaramate

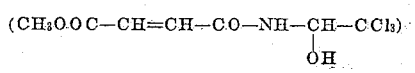

N-(alpha-hydroxy-beta-trichloroethyl)-1,2,2-trichloroacrylamide

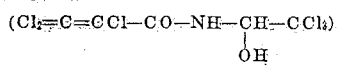

N-(alpha-hydroxy-beta-trichloroethyl) crotonamide

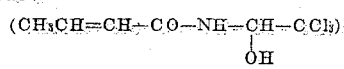

N-(alpha-hydroxy-beta-trichloroethyl) chloroacetamide

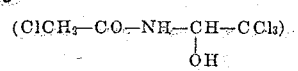

Sym.-di(alpha-acetoxy-beta-trichloroethyl)-carbamide

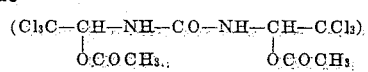

Anhydrodichloral urea

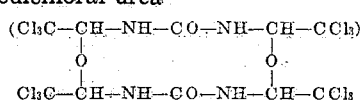

N-(alpha-hydroxy-beta-trichloroethyl) maleamic acid

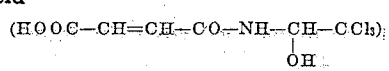

Sym.-di(alpha-butyroxy-beta-trichloroethyl) carbamide

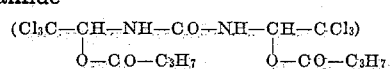

The rates at which the materials contemplated herein are preferably applied, assuming that they are applied as dusts or as aqueous suspensions with applicator nozzles operating closely to the surface of the earth and below the level of the lower leaves of the crop plants, are from 4 to 10 pounds of active material per acre. In dusting or spraying over the tops of crop plants 30–40% more active material per acre may be used to allow for the material which does not wash or fall off of the crop plants onto the ground. More material than noted above may be used but the excess material is unnecessary and represents a practical waste of material. The larger amounts of materials are to be used on muck soils which are continually wet and in cases where the grass is resistant, for example rye grass. The smaller amounts of materials are to be used in areas of little rain, or other wetting of the soil, and in cases where crabgrass, foxtail, pigeon grass or similar susceptible grasses are to be inhibited.

Where the growth of grasses is inhibited to any extent from less than 100% down to 50% of the growth of untreated grass, the grass plants will die. When the growth of the grass is inhibited as little 25% of the growth of untreated grass, the inhibited grass will not make seeds so annual grasses are almost completely eliminated by the second growing season merely by treatment of the ground before these grasses emerge during the first growing season and continuing the treatment to maintain inhibitive amounts of the herbicides in the soil. For instance, the application of the herbicides to the earth before crabgrass seedlings emerge, will prevent the emergence of the majority of the possible seedlings. Of the seedlings which emerge, the majority will wither and die before reaching 50% of the growth of crabgrass on untreated ground; and the few seedings which do not thus die will be so affected that even though they reach a growth apparently nearly normal, they will not produce seeds. With normal rainfall, crabgrass seedlings which show later than three weeks after the first application of the herbicides indicate that the herbicide has been leached from the soil and another application of the herbicide is desirable. With continuous and heavy rains a new crop of seedlings may show within 1½ weeks after a prior application of the herbicide, indicating the desirability of another application of the herbicide. The distinction is between seedlings which show but develop slowly and seedlings which show and then develop at an apparently normal rate. Whenever the agriculturist finds that seedlings, after showing at the soil surface, develop at a rate which his experience indicates is normal for his particular locality and growing conditions, the desirability of another application of the herbicide is indicated.

While not phytotoxic by leaf contact, these materials are inhibitive with respect to onions and Phaseolus-type legumes as well as to grasses by root uptake; and they should not be applied to fields where these plants are to grow. But as the materials have little or no contact phytotoxicity they are quite safe to use in fields of crops other than legumes, onions and grass, even as dust, at rates which are sufficient to inhibit grass. When applying the inhibitors over, for instance, the tops of a field of beet plants which adjoins a field of Phaseolus-type legumes, the inhibitor which might be blown from the beet field to the legume field lodges mostly on the leaves of the legumes, if the plants are in leaf, on that side of the plant nearest the beet field; and if washed to the ground by rain, the inhibitor lodges on the ground away from the roots of the plant and only about one-half of the inhibitive requirement lodges near the legume in any event. If the legumes are not in leaf, the wind-borne inhibitor is distributed over a wider area of the legume field, the deposit is exceedingly attenuated and there is still less danger of damage to the legumes.

For general agricultural use, it is preferred to package the materials as wettable powders containing a finely-divided solid extender or filler. Compositions of the following formula have been found satisfactory for general use:

| | Parts by weight |
|---|---|
| Active material 1, 2 or 3 | 86 |
| Solid diluent | 10 |
| Wetting agent | 4 |

In this formula for general use the solid extender, filler or diluent is desirably a material which is very finely divided and of low specific gravity and can act as a suspending agent in aqueous compositions, for instance diatomaceous earth as distinguished from sand which has a high specific gravity and a strong tendency to settle out of an aqueous spray composition. Suitable diatomaceous earths are marketed under the proprietary name "Celite," grades "209" and "400" giving satisfactory results.

The wetting agent is preferably non-ionic; and substantially any surface active agent of this type is satisfactory. These materials may be organic acid derivatives of alcohols, including polyhydroxy alcohols, as glycols, for instance the higher fatty acid esters of the polyethylene glycols, or water-soluble products which are higher alkaryl ethers of polyethylene glycol which may be made by reacting a higher alkyl phenol with ethylene oxide.

The agriculturist may use the unextended active material or a composition of the above formula, dusting or spreading it over his field at about 5 pounds per acre; but as it is difficult to spread such a small amount of material evenly over an acre of land, the agriculturist will normally extend the material with more solid or liquid extender. A composition containing both the solid diluent and the wetting agent is adapted for dilution with either a solid or a liquid extender. Where the active material is to be applied in a dry condition, it, or a composition of the above formula or a composition of the above formula omitting the wetting agent, may be mixed with a dry extender, for instance sand, earth, fertilizer and the like, in any proportion and applied to the field by spreading, dusting or the like. Where the active material is to be applied as an aqueous spray, it may be mixed into water containing substantially any non-ionic wetting agent, or a composition of the above formula, or a composition of the above formula omitting the solid diluent, may be mixed with water. Also where water is to be the extending agent, the active material may be packaged directly after formation and without drying, with or without the wetting agent. The active materials do not wet readily with water, dry easily, and are not hygroscopic; they are not greasy, oily or soapy but rather are dry, hard, freely-flowing crystalline powders, and do not readily adhere to the leaves of a plant.

The previous composition formula is for a concentrate containing a high percentage of active material with sufficient diatomaceous earth to render the active material easily distributable in additional amounts of dry extenders and easily suspensible in water even with the small amount of wetting agent given. For 86 parts of active material the solid suspending agent may run from 10 to 86 parts and the wetting agent from 2 to 10 parts. For aqueous sprays, water may run from 40 to 100 or more gallons. Larger amounts of the agents afford no better aqueous suspensions even though the suspensions are more dilute. The greater the amount of extending agent or diluent, the more evenly the active material may usually be applied but from 40 to 100 gallons of water and from 300 pounds (a dusting application with pyrophyllite or other dusting material) to 2 tons (a spreading application with lime) of solid diluent, for instance pyrophyllite, sand, lime, fertilizer, earth and the like, can be applied rather evenly per acre with modern equipment and these amounts of diluents are preferred for low cost application of the herbicides.

Even where the materials are applied with a large amount of liquid, they are preferably applied as slurries of the material suspended in water and not as solutions. Solid or non-evaporable mutual solvent materials used in such quantities as to hold the active material in solution are disadvantageous in that the herbicidal materials dissolved in or mixed with the mutual solvent remain on, or in, the surface of the soil only until the next rain when they wash farther into the soil and become very dilute. The agents or other addends used with the active material should not be phytotoxic, at least in the concentration at which they are used in the dust or spray.

The active materials disclosed herein are preferably applied as dusts or heavier particulate materials from nozzles passing as closely to the surface of the earth as possible so that the materials are applied under the crop plants. The materials may also be applied as aqueous sprays from low nozzles. Dusts or dry compositions are preferred in order to eliminate the necessity of transporting water to the fields; and by applying the dusts closely to the ground little material is lost by being wind-borne, substantially no material being lost where a heavy extender, for instance sand, is used. However, the materials may be applied in particulate form over the tops of the crop plants, for instance by sprayers or dusters or by airplane, rain and leaf flexing being relied upon to cause the materials to fall from the crop plants to the earth. In the sprays, the herbicides are in finely-divided particulate form. For other applications the herbicides and the compositions applied are finely divided, particulate and pulverulent. In the case of cabbage and such plants as have heads with upwardly folded leaves presenting pockets where the inhibitors might lodge, it is highly desirable to apply the inhibitors close to the ground and under the plants. As the materials have little or no epinastic effects, crop plants in the treated field and crop plants in adjoining fields onto which the materials may drift, are not killed.

As will be understood from the foregoing description, the materials disclosed herein as operative are non-phytotoxic by contact but are selective germinative toxicants for grass seeds and seedlings and operate by uptake through root absorption. They are extremely useful as selective herbicides on crops other than grasses and Phaseolus-type legumes. Even when applied but once at, or shortly after, planting the crop, they will at least suppress the growth of grasses until the crop has advanced so far that grass growth in the row proper is suppressed later on by shading and by crop competition. Due to their inactivity with respect to plant foliage they are safe to use on a field surrounded by fields of other crops. The herbicides are surprisingly potent and are enduring when properly applied to the earth as evidenced by the fact that as they are substantially water insoluble and are effective when used at only 4 or 5 pounds per acre, substantially no more than infinitesimal amounts of the herbicides inhibit the growth of grass. With a water-soluble herbicide a large amount of the toxicant is almost immediately available to the plant root and the toxicant soon leaches out of the soil. The opposite is true of the operative herbicides herein disclosed which are applied in particulate, pulverulent and finely-divided form. The growth of annular grass in any one season may be prevented substantially entirely by the application of from 4 to 5 pounds of the materials per acre directly after planting the crop in fitted land and the application of from 1½ to 2½ pounds per acre if and when grass again sprouts in areas where the rainfall is the normal of from 30 to 40 inches per year. In muck soils, for instance in Florida, and where there is excessive rain, the first application should be about 7 pounds per acre; and the second application of about 3 pounds per acre should be made when new normally-developing grass seedlings are observed. Scattered grass seedlings showing above the ground within 6 weeks after the last application of the herbicide in areas of normal rainfall and within 3 weeks in areas of muck soil or excessive rainfall usually will not develop much beyond the seedling stage and will finally die; but the development of seedlings later than this (although the seedlings will not finally develop into seed-bearing plants) indicates that the herbicides have become too attenuated and another application of the materials is desirable. As the materials give no epinastic effects, they may be applied at the highest rate per acre which does not stunt the crop plant.

Where it is desired to eradicate perennial grasses, for instance quack-grass and Johnson grass, the herbicides may be applied at rates of 50 or more pounds per acre. Application of the herbicides at these rates will kill grass in driveways and along roads. For land to be used for broadleaf crops, the herbicides should be applied at these high rates at least 3 months before the crops are planted. The high rate application is preferably made in the fall (after the crops have been harvested if the land was cropped or earlier if the land was idle) so that the grass roots, during the late season growth of the grass, are subjected to the effect of the herbicides. The root uptake of the herbicide continues during the winter but the herbicide is normally sufficiently leached from the soil during 3 months of melting snow or rains that when the land is plowed and the remaining herbicide is worked down into the soil, it is so attenuated that it does not affect the crop plants.

What is claimed is:

1. Method of inhibiting the germination of grass seeds and of killing grass seedlings which comprises applying to the surface of the earth containing the seeds or seedlings, a herbicide of the group consisting of dichloral urea, alpha-hydroxy - beta - trichloroethyl carbamide, and N,N' - bis - (alpha - hydroxy - beta - trichloroethyl)-1,3-ethylene urea.

2. Method as recited in claim 1 wherein the herbicidal material is applied at the rate of from about 4 to about 10 pounds per acre.

3. A composition adapted to be applied to the earth to inhibit the germination of grass seeds, said composition comprising a herbicidal material which is a member of the group consisting of dichloral urea, alpha - hydroxy - beta(trichloroethyl) carbamide, and N,N'-bis(alpha-hydroxy-beta-trichloroethyl)-1,3-ethylene urea, and a wetting agent, the herbicidal material being in particulate form and in greater amount than the wetting agent.

4. A composition adapted to be applied to the earth to inhibit the germination of grass seeds, said composition comprising a herbicidal material which is a member of the group consisting of dichloral urea, alpha - hydroxy - beta(trichloroethyl) carbamide, and N,N'-bis(alpha-hydroxy-beta-trichloroethyl)-1,3-ethylene urea, and an extending agent, both the herbicidal material and the extending agent being in particulate form.

5. A composition adapted to be applied to the earth to inhibit the germination of grass seeds, said composition comprising a herbicidal material which is a member of the group consisting of dichloral urea, alpha - hydroxy - beta(trichloroethyl) carbamide, and N,N'-bis(alpha-hydroxy-beta-trichloroethyl)-1,3-ethylene urea, a wetting agent and an extending agent, the composition being in particulate form and adapted for extension with either a fluid or a particulate extending agent.

LAWRENCE J. KING.

REFERENCES CITED

The following references are of record in the file of this patent:

UNITED STATES PATENTS

| Number | Name | Date |
| --- | --- | --- |
| 2,390,941 | Jones | Dec. 11, 1945 |

OTHER REFERENCES

Botanical Gazette, June 1946, pgs. 475 to 483, 489 and 490 (pgs. 489 and 490 particularly relied upon).